2,988,557
16α-THIOL CORTICOIDS AND THEIR DERIVATIVES

Hans Reimann, Bloomfield, and Elliot L. Shapiro, Irvington, N.J., assignors to Schering Corporation, Bloomfield, N.J., a corporation of New Jersey
No Drawing. Filed Dec. 16, 1959, Ser. No. 859,856
17 Claims. (Cl. 260—397.45)

This invention relates to a new series of therapeutically active synthetic steroids and to methods for their preparation. More particularly, this invention relates to certain 16α-thiol steroids of the pregnene and pregnadiene series and to derivatives thereof which display important therapeutic activity in the treatment of arthritis and other inflammatory conditions.

It is now well established that the efficacy of early steroidal therapeutic agents such as cortisone and hydrocortisone can be enhanced substantially through modification of the structures of these hormones so as to reduce or delay inactivation of the molecule believed to be promoted by natural mechanisms within the human body. To this end, past efforts have resulted in the preparation of the $\Delta^{1,4}$ and $\Delta^{1,4,6}$ derivatives, C-9 halogenated and C-6,9-dihalogenated derivatives, C-2 and C-6 methylated derivatives, C-14 and C-16 hydroxylated derivatives, C-16 methylated derivatives, and combinations of these structures. While certain of the above-enumerated compounds, and particularly the C-9 halogenated compounds, having displayed remarkably enhanced anti-inflammatory activity, at least some have also evidenced untoward side effects such as increased salt retention and edema-producing characteristics, disturbances in estrogenic and androgenic activity, loss of bone calcium, ulcerogenesis, potassium loss, etc. Of particular interest from the standpoint of present research efforts are the salt and water retention characteristics induced through the use of several of the otherwise most efficacious anti-inflammatory agents available today including, for example, the 9α-halo corticoids.

As mentioned above, the present invention is based, in part, on our discovery that the novel compounds of the instant claims are useful anti-inflammatory agents. Moreover, the presence of the C-16 thiol substituent in the 9α-halo compounds of this invention reduces or eliminates the undesirable salt retaining activity normally characteristic of 9α-halo compounds without eliminating their anti-inflammatory activity.

The novel compounds of this invention may be represented by the following general formula:

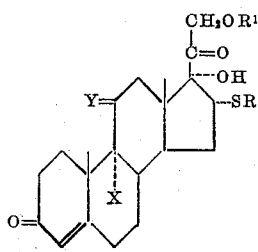

and the 1(2)-dehydro analogues thereof, in which R may be H, lower alkyl, or lower alkanoyl; $R^1$ may be H, a mono- or dicarboxylic acid radical having up to 10 carbon atoms, the sulfate radical, or the phosphate radical; Y may be (H,βOH) or =O; and X may be H or halogen.

In general, the novel compounds of this invention are prepared by the addition of sulfur compounds such as hydrogen sulfide, lower alkyl mercaptans (e.g. methyl and ethyl mercaptan), and lower thiol alkanoic acids (e.g. thiolacetic acid and thiolpropionic acid) to suitable 16-dehydro-20-keto steroids to give the corresponding 16α-thiol-20-keto compounds. These compounds are then subjected to further reactions well known in the art to convert them to the cortisone, hydrocortisone, prednisone and prednisolone derivatives indicated by the above formula.

While many variations in starting materials and reaction sequences are possible, the following table, Table I, represents the more preferred sequence for preparing the compounds of this invention. For purposes of illustration only, the thioacetoxy and acetate groups are employed in this sequence, as well as in the subsequent description thereof, as the 16α-thiol substituent and the 21-acyl substituent, respectively. It is understood, however, that no limitation, except as defined by the appended claims, is intended.

TABLE I

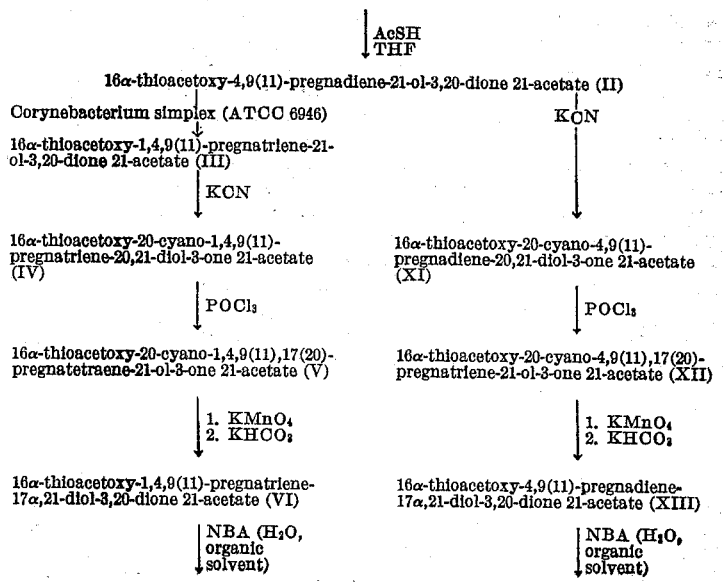

```
16α-thioacetoxy-9α-bromo-1-4-pregnadiene-    16α-thioacetoxy-9α-bromohydrocortisone
11β,17α,21-triol-3,20-dione 21-acetate (VII)  21-acetate (XIV)
                    │ Zn                                │ Zn
                    ↓                                   ↓
16α-thioacetoxyprednisolone 21-acetate        16α-thioacetoxyhydrocortisone 21-acetate
(VIII)                                        (XV)
         │ CrO₃                │                    │ CrO₃              │
         │ H₂SO₄               │ HCl                │ H₂SO₄             │ HCl
         │ Acetone             │                    │ Acetone           │
         ↓                     ↓                    ↓                   ↓
16α-thioacetoxy-       16α-thioacetoxy-      16α-thioacetoxy-     16α-thioacetoxy-
prednisone 21-         prednisolone (X)      cortisone 21-acetate hydrocortisone
acetate (IX)                                 (XVI)                (XVII)
```

As indicated schematically above, the compounds of this invention may be prepared by treating the known steroid, 4,9(11),16-pregnatriene-21-ol-3,20-dione 21-acetate (I), with thiolacetic acid in tetrahydrofuran (THF) to give 16α-thioacetoxy-4,9(11)-pregnadiene-21-ol-3,20-dione 21-acetate (II). This compound is then microbiologically dehydrogenated, for example by *Corynebacterium simplex* (ATCC 6946), to the 1-dehydro compound III and treated with potassium cyanide to form the 20-cyanohydrin (IV) which is dehydrated with phosphorus oxychloride in pyridine to 16α-thioacetoxy-20-cyano-1,4,9(11),17(20)-pregnatetraene-21-ol-3-one 21-acetate (V). Hydroxylation at the C–17 double bond with potassium permanganate and cleavage of the resulting 20-cyanohydrin with potassium bicarbonate completes the corticoid dihydroxy-acetone side chain and yields 16α-thioacetoxy-1,4,9(11)-pregnatriene-17α,21-diol-3,20-dione 21-acetate (VI). This compound is then treated with N-bromoacetamide (NBA) and water in the presence of perchloric acid to give 16α-thioacetoxy-9α-bromo-1,4-pregnadiene-11β,17α,21-triol-3,20-dione 21-acetate (VII) which is dehalogenated by treatment with zinc dust to form 16α-thioacetoxyprednisolone 21-acetate (VIII). Oxidation of this compound with chromic acid-sulfuric acid mixture gives 16α-thioacetoxyprednisone 21-acetate (IX). The 21-acetates in the above reaction sequence may be hydrolyzed to the corresponding 21-alcohols by treatment with mild acid or base, or by means of a microorganism such as *Flavobacterium dehydrogenans*. Thus, compound XVIII is treated with dilute hydrochloric acid to give 16α-thioacetoxyprednisolone (X). As indicated in Table I, omission of the 1,2-dehydrogenation step leads to the preparation of the corresponding 16α-thioacetoxycortisone and 16α-thioacetoxyhydrocortisone derivatives.

Where other 9α-halogenated compounds are desired, the 9α-bromo-compound, 16α-thioacetoxy-9α-bromo-1,4-pregnadiene-11β,17α,21-triol-3,20-dione 21-acetate (VII) for example, is treated with potassium acetate to form the 9β,11β-epoxide (XVIII) which is then reacted with hydrogen fluoride to give 16α-thioacetoxy-9α-fluoro-prednisolone 21-acetate (XIX). Hydrogen chloride or hydrogen iodide could be used in this step to produce the corresponding 9α-chloro- or 9α-iodo- derivatives. As shown schematically in Table II, compound XIX may be oxidized to give 16α-thioacetoxy-9α-fluoroprednisone 21-acetate (XX) or hydrolyzed to give 16α-thioacetoxy-9α-fluoroprednisolone (XXI) by methods previously described. Analogous treatment of 16α-thioacetoxy-9α-bromohydrocortisone 21-acetate (XIV) yields the corresponding 9α-fluorocortisone and 9α-fluorohydrocortisone derivatives.

TABLE II

```
16α-thioacetoxy-9α-bromo-1,4-pregnadiene-11β,17α,21-triol-3,20-dione 21-acetate (VII)
                            │ KOAc
                            ↓
16α-thioacetoxy-9β,11β-oxido-1,4-pregnadiene-17α,21-diol-3,20-dione 21-acetate (VIII)
                            │ HF
                            ↓
           16α-thioacetoxy-9α-fluoroprednisolone 21-acetate (XIX)
                   ╱ CrO₃                      ╲
                  ╱  H₂SO₄                      ╲ HCl
                 ╱   Acetone                     ╲
                ↓                                 ↓
  16α-thioacetoxy-9α-fluoroprednisone    16α-thioacetoxy-9α-fluoroprednisolone
         21-acetate (XX)                               (XXI)
```

The reaction sequences described above, using hydrogen sulfide instead of thiolacetic acid, lead to the preparation of 16α-thiol and 16α-thiol-9α-haloprednisones, prednisolones, cortisones, and hydrocortisones. Correspondir 16α-alkylmercapto and 16α-alkylmercapto-9α-halo derivatives are prepared analogously by employing lower alkyl mercaptans as the sulfur compounds.

Other 16-dehydro-20-keto steroids may be used as starting materials in the preparation of the novel compounds of this invention. For example, the thio compound may be added to 4,16-pregnadien-21-ol-3,11,20-trione 21-acetate to give a 16α-thio-substituted-11-dehydrocorticosterone 21-acetate which may be converted to the 17α-hydroxy compound, 16α-thio-substituted cortisone 21-acetate, by treatment with cyanide followed by dehydration and hydroxylation as described above. The cortisone derivative may be microbially converted to the 1-dehydro compound, or it may be converted to the 16α-thio-substituted hydrocortisone by protection of the C–3 and C–20 carbonyl groups, as the ethylene ketals for example, reduction with a suitable reagent such as sodium borohydride, and hydrolysis of the ketal groups with dilute acid.

As another example of starting material, the thio compound may be added to 16-pregnen-3α-ol-11,20-dione. The addition compound is converted to the 20-cyanohydrin as previously described and then dehydrated, hydroxylated and hydrolyzed to give the 16α-thio-substituted pregnane-3α,17α-diol-11,20-dione. This compound is then brominated at C–21 with bromine in a suitable solvent such as chloroform and the bromine replaced by treatment with sodium acetate. The resulting ester, 16α-thio-substituted pregnane-3α,17α,21-triol-11,20-dione 21-acetate, is oxidized to the 3-ketone by chromic acid. Bromination and dehydrobromination of the 3-ketone gives 16α-thio-substituted cortisone and prednisone acetates. Alternatively, the prednisone derivatives may be prepared from the saturated 3-ketone by treatment with selenium dioxide or by microbiological dehydrogenation with organisms such as *Protaminobacter alboflavum* (ATCC 8458) and *Protaminobacter rubrum* (ATCC 8457) which are disclosed in U.S. Patent No. 2,876,171 issued March 3, 1959.

In a further variation of the synthetic sequence, the starting material may be a 16-dehydro-20-keto-11-desoxy-pregnane derivative such as 16-allo-pregnen-3β-ol-20-one 3-acetate. The thio compound is added to the 16-dehydro-20-keto system as described above, following which the 17α- and 21-hydroxy groups are introduced as before. The resulting compound is then hydroxylated in the 11-position by a microorganism such as *Curvularia lunata* (QM 120h). Acetylation at C–21 and introduction of the 3-keto-$\Delta^4$ or 3-keto-$\Delta^{1,4}$ system as previously described gives the 16α-thio substituted hydrocortisone or prednisolone 21-acetates which may be dehydrated at C–9(11) with a reagent such as methanesulfonyl chloride in pyridine. The dehydrated product may then be converted to 9α-halo-16-thio-substituted corticoids as described above.

In the synthesis of the compounds of our invention, the 17α-hydroxy groups may also be introduced by microbiological hydroxylation with an organism such as *Cephalothecium roseum* (ATCC 8685). Thioacetic acid, for example, may be added to 4,16-pregnadiene-11β,21-diol-3,20-dione 21-acetate to give 16α-thioacetoxy-4-pregnene-11β,21-diol-3,20-dione 21-acetate which is then incubated with *C. roseum* to give directly 16α-thioacetoxyhydrocortisone 21-acetate. Dehydrogenation by the use of *Corynebacterium simplex* (ATCC 6946) gives 16α-thioacetoxy-prednisolone 21-acetate. These compounds may be oxidized to the corresponding 11-keto steroids (i.e. the corresponding cortisone and prednisone derivatives) with an oxidizing agent such as chromic acid, or dehydrated at C–9(11) by treatment with a reagent such as methanesulfonyl chloride in pyridine and converted to the 9α-halo-16α-thioacetoxy corticoids by methods previously described. By the same sequence of reactions, starting with the addition of methyl mercaptan for example, the corresponding 16α-thiomethylcorticoids and 16α-thiomethyl-9α-halocorticoids may be prepared.

The addition of the thio compounds may be carried out in the thio compound per se as a solvent, when it is a liquid at suitable temperatures, or in an inert solvent such as methylene chloride, chloroform, dioxane, tetrahydrofuran or benzene. A catalytic amount of a strong acid, such as perchloric or p-toluenesulfonic acid, or of a base, such as piperidine, may be added. The reaction is generally carried out at temperatures between 15° C. and 100° C., although higher or lower temperatures may be used. The reaction time may vary considerably, depending upon the compound and the temperature employed, but is generally between 15 minutes and 48 hours. In general, a large excess of the thio compound is employed.

The novel compounds of this invention may be used as the 21-alcohols or as suitable esters thereof. Useful esters, for example, are the acetate, propionate, iso-valerate, enanthate, tert.-butyl acetate, and cyclopentyl propionate. Other valuable esters are the phenoxyacetate and substituted phenoxyacetates, such as the 4-chloro-, 4-bromo-, 2,4-dibromo-, 4-methyl- and 4-methoxy-phenoxy acetates; the furoate and substituted furoates, such as the 5-chloro-, 5-bromo-, 5-methyl- and 5-tert.-butyl furoates; the carbethoxylate, etc.

Water soluble esters such as the monosodium succinate, phthalate, sulfobenzoate, phosphate and sulfate as well as glycinate salts, gluconates, etc. have great utility.

The esters are generally prepared from the corresponding 21-hydroxy steroid by treatment with a suitable acid-halide or acid anhydride in a solvent such as pyridine.

The following examples are further illustrative of this invention.

Example 1

16α-THIOACETOXY-$\Delta^{4,9(11)}$-PREGNADIENE-3,20-DIONE-21-OL ACETATE

A solution of 5 g. of $\Delta^{4,9(11),16}$-pregnatriene-3,20-dione-21-ol-acetate in a mixture of 50 ml. of tetrahydrofuran and 25 ml. of thiolacetic acid is refluxed for 2 hours, chilled and poured into ice water. The excess thiolacetic acid is neutralized by careful addition of sodium bicarbonate with stirring and the product extracted with methylene chloride. The extracts are washed with 5% sodium hydroxide solution and with water, then dried over anhydrous magnesium sulfate and the solvent removed under reduced pressure. The residue is crystallized by addition of a little ether and recrystallized from acetone-hexane.

$$\lambda_{max}^{MeOH} = 238 \text{ m}\mu$$

Example 2

16α-THIOACETOXY-$\Delta^{1,4,9(11)}$-PREGNATRIENE-3,20-DIONE-21-OL ACETATE

Two grams of the product of Example 1 are fermented by means of *Corynebacterium simplex* (ATCC 6946) according to the procedure of U.S. Patent 2,837,464 of A. Nobile, 6/3/58. The crude product is chromatographed on Florisil and the fractions eluted with 30% ether in hexane are combined and crystallized from acetone-hexane to give the desired product.

Example 3

16α-THIOACETOXY-20-CYANO-$\Delta^{1,4,9(11)}$-PREGNATRIENE-20,21-DIOL-3-ONE 21-ACETATE A solution of 1.5 g. of the compound of Example 2 in 15 ml. of ethanol and 5 ml. of acetic acid is cooled to 0° C. and treated with 3.5 g. of potassium cyanide. The solution is stirred for 30 minutes, then allowed to warm to room temperature and diluted with water. The product is filtered, washed well with water and recrystallized from ethyl acetate.

Example 4

16α-THIOACETOXY-20-CYANO-$\Delta^{1,4,9(11),17(20)}$-PREGNA-TETRAENE-21-OL-3-ONE 21-ACETATE A solution of 2.0 g. of the compound of Example 3 in 20 ml. of dry pyridine is treated with 2 ml. of phosphorus oxychloride and the mixture allowed to stand at room temperature for 18 hours. It is then poured into ice-water and the product filtered, washed well with water, dissolved in acetone, treated with decolorizing carbon and crystallized from aqueous acetone.

Example 5

16α-THIOACETOXY-$\Delta^{1,4,9(11)}$-PREGNATRIENE-17α,21-DIOL-3,20-DIONE 21-ACETATE A solution of 1.0 g. of the compound of Example 4 in 35 ml. of acetone containing 1 ml. of piperidine is chilled to 0° C. and treated with 920 mg. of fine granular potassium permanganate. The reaction mixture is stirred at 0° C. for 1½ hours, then warmed to room temperature and a solution of 0.2 ml. of acetic acid in 2 ml. of acetone added dropwise with stirring. After 1½ hours, the reaction mixture is diluted with chloroform and treated with bisulfite and 1 N sulfuric acid to dissolve the manganese dioxide. The mixture is extracted with chloroform, and the extracts washed with water and concentrated to 100 ml. The solution is stirred vigorously with 100 ml. of 5% potassium bicarbonate for one hour, then the organic layer is separated, washed with water and evaporated to dryness under reduced pressure. The product is crystallized by addition of a small amount of ether, filtered and recrystallized from pentane-methylene chloride.

Example 6

16α-THIOACETOXY-9α-BROMO-Δ¹,⁴-PREGNADIENE-3,20-DIONE-11β,17α,21-TRIOL 21-ACETATE

A suspension of 500 mg. of the compound of Example 5 in 50 ml. of dioxane and 5 ml. of water, containing 250 mg. of N-bromoacetamide and 2.5 ml. of 1.5 N perchloric acid is stirred for two hours. The resulting solution is treated with 500 mg. of sodium sulfite in 5 ml. of water and the solution extracted with methylene chloride. The extracts are washed with water, dried and the solvent removed under reduced pressure. The residue is crystallized from acetone to give the desired product.

Example 7

16α-THIOACETOXYPREDNISOLONE 21-ACETATE

A solution of 100 mg. of the product of Example 6 in 30 mg. of ethanol and 5 ml. of water is shaken with zinc dust at room temperature for 18 hours. At the end of this period the zinc dust is filtered off and washed with ethanol. The alcoholic solution is concentrated in vacuo, water is added, and the aqueous suspension extracted with chloroform. The extract is evaporated to dryness and the residue chromatographed on silica gel. Elution with 1:1 benzene-chloroform yields the compound of Example 5. After some mixed fractions elution with chloroform gives the desired product, which is crystallized from acetone.

Example 8

16α-THIOACETOXYPREDNISONE 21-ACETATE

A solution of 100 mg. of the product of Example 7 in 10 ml. of acetone is cooled to 0° C. and titrated with chromic-sulfuric acid reagent (266 mg. chromic acid/ml.) until persistance of orange color. A few drops of methanol are added to destroy excess reagent, then the solution is diluted with water and the product extracted with methylene chloride. Evaporation of the solvent and crystallization of the residue from acetone-hexane gives the desired compound.

Example 9

16α-THIOACETOXYPREDNISOLONE

A solution of 75 mg. of the compound of Example 7 in a mixture of 15 ml. of methanol, 3 ml. of chloroform, 1 ml. of water, and 0.75 ml. of concentrated hydrochloric acid is allowed to stand at room temperature for 48 hours. The solution is diluted with water and extracted with methylene chloride. The extracts are washed with water and the solvent removed in vacuo. The product is crystallized from acetone-hexane.

Example 10

16α-THIOACETOXY-9β,11β-OXIDO-Δ¹,⁴-PREGNADIENE-17α,21-DIOL-3,20-DIONE 21-ACETATE

To a solution of 300 mg. of the compound of Example 6 in 20 ml. of methanol is added 300 mg. of potassium acetate. The mixture is refluxed for 2 hours, then the solvent is removed under reduced pressure. The residue is triturated with water, filtered, washed with water and crystallized from aqueous acetone to give the desired product.

Example 11

16α-THIOACETOXY-9α-FLUOROPREDNISOLONE 21-ACETATE

A solution of 250 mg. of the compound of Example 10 in 15 ml. of redistilled chloroform is saturated with anhydrous hydrogen fluoride at 0° C. The mixture is allowed to stand at 0° C. for 5 hours, then the solvent is blown off under a stream of nitrogen. The residue is crystallized from acetone to give the desired product.

Example 12

16α-THIOACETOXY-9α-FLUOROPREDNISONE 21-ACETATE

The compound of Example 11 (100 mg.) is oxidized with chromic-sulfuric acid reagent according to Example 8. The product is crystallized from acetone-hexane.

Example 13

16α-THIOACETOXY-9α-FLUOROPREDNISOLONE

The compound of Example 11 (100 mg.) is hydrolyzed according to Example 9. The product is crystallized from acetone.

Example 14

16α-THIOACETOXY-20-CYANO-Δ⁴,⁹⁽¹¹⁾-PREGNADIENE-20,21-DIOL-3-ONE 21-ACETATE

A solution of 1.0 g. of the compound of Example 1 in ethanol is treated with 3 g. of potassium cyanide according to Example 3. The reaction is worked up as described and the product crystallized from ethyl acetate.

Example 15

16α-THIOACETOXY-20-CYANO-Δ⁴,⁹⁽¹¹⁾,¹⁷⁽²⁰⁾-PREGNATRIENE-21-OL-3-ONE 21-ACETATE

A solution of 1.5 g. of the compound of Example 14 in pyridine is dehydrated and the product purified according to Example 4. The product is crystallized from aqueous acetone.

Example 16

16α-THIOACETOXY-Δ⁴,⁹⁽¹¹⁾-PREGNADIENE-17α,21-DIOL-3,20-DIONE 21-ACETATE

One gram of the compound of Example 15 is reacted according to the procedure of Example 5. The product is purified as described and crystallized from hexane-methylene chloride.

Example 17

9α-BROMO-16α-THIOACETOXYHYDROCORTISONE 21-ACETATE

Treatment of 500 mg. of the compound of Example 16 with water and N-bromoacetamide according to the procedure of Example 6, and crystallization of the crude product from acetone gives the desired product.

Example 18

16α-THIOACETOXYHYDROCORTISONE 21-ACETATE

A sample of 100 mg. of the product of Example 17 is reduced with zinc according to Example 7. The crude product is purified as described and the desired product crystallized from acetone.

Example 19

16α-THIOACETOXYCORTISONE 21-ACETATE

The product of Example 18 (50 mg.) is oxidized according to Example 8. The product is crystallized from acetone-hexane.

Example 20

16α-THIOACETOXYHYDROCORTISONE

The compound of Example 18 (75 mg.) is hydrolyzed according to Example 9. The product is crystallized from acetone-hexane.

Example 21

16α-THIOACETOXY-9β,11β-OXIDO-Δ⁴-PREGNENE-17α,21-DIOL-3,20-DIONE 21-ACETATE

A solution of 500 mg. of the compound of Example 17 in methanol is treated with potassium acetate according to Example 10. The product is crystallized from aqueous acetone.

Example 22

16α-THIOACETOXY-9α-FLUOROHYDROCORTISONE 21-ACETATE

Treatment of 200 mg. of the compound of Example 21 with hydrogen fluoride according to Example 11 gives the desired material which is crystallized from acetone.

Example 23

16α-THIOACETOXY-9α-FLUOROCORTISONE 21-ACETATE

The compound of Example 22 (100 mg.) is oxidized with chromic-sulfuric acid reagent according to Example 8. The product is crystallized from acetone-hexane.

Example 24

16α-THIOACETOXY-9α-FLUOROHYDROCORTISONE

The compound of Example 22 (100 mg.) is hydrolyzed according to Example 9. The product is crystallized from acetone.

Example 25

16α-THIOACETOXYPREDNISOLONE 21-PROPIONATE

A solution of 200 mg. of the compound of Example 9 in 5 ml. of dry pyridine is treated with 0.5 ml. of propionic anhydride and allowed to stand at room temperature for 3 hours. The solution is poured into ice-water and the product filtered and crystallized from acetone-hexane.

Example 26

16α-THIOACETOXY-9α-FLUOROPREDNISOLONE 21-CARBETHOXYLATE

A solution of 250 mg. of the compound of Example 13 in 5 ml. of dry pyridine is treated with 0.5 ml. of ethyl chlorocarbonate and allowed to stand at room temperature for 4 hours. The mixture is then poured into ice-water and the product filtered and crystallized from acetone.

Example 27

16α-THIOMETHYL-$\Delta^{4,9(11)}$-PREGNADIENE-3,20-DIONE-21-OL ACETATE

To a solution of 50 ml. of benzene, 81 ml. of methyl mercaptan and 1.5 ml. of piperidine is added 5 g. of $\Delta^{4,9(11),16}$-pregnatriene-3,20-dione-21-ol-acetate. The reaction mixture is stirred at room temperature for 48 hours. Water is added and the benzene phase separated, washed 2 times with dilute hydrochloric acid, and then with water again. The organic phase is dried over magnesium sulfate, filtered and evaporated to a residue. Crystallization from acetone-hexane affords the compound of this example.

Example 28

16α-THIOMETHYL-$\Delta^{1,4,9(11)}$-PREGNATRIENE-3,20-DIONE-21-OL ACETATE

Two grams of the product of Example 27 are fermented with *Corynebacterium simplex* (ATCC 6946) according to the procedure of U.S. Patent 2,837,464 of A. Nobile, 6/3/58. The crude product is crystallized from acetone-hexane to give 16α-thiomethyl-$\Delta^{1,4,9(11)}$-pregnatriene-3,20-dione-21-ol acetate.

Example 29

16α-THIOMETHYL-20-CYANO-$\Delta^{1,4,9(11)}$-PREGNATRIENE-20,21-DIOL-3-ONE 21-ACETATE

A solution of 1.5 g. of the product of Example 28 in 15 ml. of ethanol and 5 ml. of acetic acid is cooled to 0° C. and treated with 4.5 g. of potassium cyanide. The solution is stirred for 30 minutes, then allowed to warm to room temperature and diluted with water. The product is filtered, washed well with water and crystallized from acetone-hexane, thus affording the compound of this example.

Example 30

16α-THIOMETHYL-20-CYANO-$\Delta^{1,4,9(11),17(20)}$-PREGNATETRAENE-21-OL-3-ONE ACETATE

According to the procedure of Example 4, 2.0 g. of 16α-thiomethyl-20-cyano-$\Delta^{1,4,9(11)}$-pregnatriene-20,21-diol-3-one 21-acetate is treated with 2 ml. of phosphorus oxychloride in pyridine. Crystallization of the crude reaction product from acetone-hexane affords the desired compound.

Example 31

16α-THIOMETHYL-$\Delta^{1,4,9(11)}$-PREGNATRIENE-17α,21-DIOL-3,20-DIONE 21-ACETATE

One gram of the compound of Example 30 is treated with 500 mg. of potassium permanganate in a manner similar to Example 5. Crystallization of the crude product from methylene chloride-hexane gives 16α-thiomethyl-$\Delta^{1,4,9(11)}$-pregnatriene-17α,21-diol-3,20-dione 21-acetate.

Example 32

16α-THIOMETHYL-9α-BROMO-$\Delta^{1,4}$-PREGNADIENE-3,20-DIONE-11β,17α,21-TRIOL 21-ACETATE

A suspension of 0.5 g. of the compound of Example 31 in 50 ml. of purified dioxane and 5 ml. of water, containing 148 mg. of N-bromoacetamide and 2.5 ml. of 1.5 N-perchloric acid is stirred for 3 hours. The resulting reaction solution is treated with 0.5 g. of sodium sulfite in 5 ml. of water and the solution is extracted with methylene chloride. The extracts are washed with water, dried over magnesium sulfate, filtered and evaporated to dryness. The crude residue is crystallized from acetone to give the compound of this example.

Example 33

16α-THIOMETHYLPREDNISOLONE 21-ACETATE

A solution of 100 mg. of the product of Example 32 in 35 ml. of ethanol and 5 ml. of water is shaken with zinc dust at room temperature for 19 hours. At the end of this time the zinc dust is removed by filtration. The filtrate is evaporated under reduced pressure to approximately 8 ml. Water is added and the aqueous suspension extracted with chloroform. The organic extracts are evaporated to dryness and the residue is treated with acetone-hexane, affording the desired 16α-thiomethyl-prednisolone 21-acetate.

Example 34

16α-THIOMETHYLPREDNISONE 21-ACETATE

A solution of 100 mg. of the compound of Example 33 in 10 ml. of acetone is cooled to 0° C. and allowed to react with 0.056 ml. chromic-sulfuric acid reagent (266 mg. chromium trioxide/ml.). A few drops of methanol are added to destroy any excess reagent, then the solution is diluted with water and the product extracted with methylene chloride. Evaporation of the solvent and crystallization of the residue from acetone-hexane affords the compound of this example.

Example 35

16α-THIOMETHYLPREDNISOLONE

A solution of 76 mg. of the compound of Example 33 in a mixture of 15 ml. of methanol, 3 ml. of chloroform, 1 ml. of water and 0.76 ml. of concentrated hydrochloric acid is allowed to stand at room temperature for 47 hours. The solution is diluted with water and extracted with methylene chloride. The extracts are washed with water and the solvent removed under reduced pressure to a residue which upon crystallization from acetone-hexane affords the desired compound.

Example 36

16α-THIOMETHYL-9β,11β-OXIDO-Δ¹,⁴-PREGNADIENE-17α,21-DIOL-3,20-DIONE 21-ACETATE

To a solution of 300 mg. of the compound of Example 32 in 20 ml. of methanol is added 300 mg. of potassium acetate. The mixture is refluxed for 2 hours, then the solvent is removed under reduced pressure. The residue is triturated with water, filtered, washed with water and crystallized from aqueous acetone to give the desired product.

Example 37

16α-THIOMETHYL-9α-FLUOROPREDNISOLONE 21-ACETATE

A solution of 260 mg. of the compound of Example 36 in 16 ml. of redistilled chloroform is saturated with anhydrous hydrogen fluoride at 0° C. The mixture is allowed to stand at 0° C. for 5 hours, then the solvent is blown off under a stream of nitrogen. The residue thus obtained affords the desired product upon cystallization from acetone.

Example 38

16α-THIOMETHYL-9α-FLUOROPREDNISONE ACETATE

The compound of Example 37 (100 mg.) is oxidized with chromic-sulfuric acid reagent according to Example 34. Crystallization of the crude product from acetone-hexane affords the compound of this example.

Example 39

16α-THIOMETHYL-9α-FLUOROPREDNISOLONE

The compound of Example 37 (100 mg.) is hydrolyzed according to Example 35. The crude product which is isolated is crystallized from acetone-hexane thereby affording the compound of this example.

Example 40

16α-THIOMETHYL-20-CYANO-Δ⁴,⁹⁽¹¹⁾-PREGNADIENE-20,21-DIOL-3-ONE 21-ACETATE

A solution of 1.0 g. of the compound of Example 27 in ethanol is treated with 3 g. of potassium cyanide according to Example 29. The reaction is worked up as described and the desired material is obtained after crystallization from ethyl acetate.

Example 41

16α-THIOMETHYL-20-CYANO-Δ⁴,⁹⁽¹¹⁾,¹⁷⁽²⁰⁾-PREGNATRIENE-21-OL-3-ONE 21-ACETATE

A solution of 1.6 g. of the compound of Example 40 in pyridine is dehydrated according to Example 4 with phosphorous oxychloride. Crystallization of the reaction product from acetone-hexane affords the compound of this example.

Example 42

16α-THIOMETHYL-Δ⁴,⁹⁽¹¹⁾-PREGNADIENE-17α,21-DIOL-3,20-DIONE 21-ACETATE

One gram of the compound of Example 41 is reacted with potassium permanganate according to Example 31. The reaction is worked up in a manner similar to the procedure described in Example 5. Crystallization from methylene chloride-hexane affords the desired compound.

Example 43

16α-THIOMETHYL-9α-BROMOHYDROCORTISONE 21-ACETATE

Treatment of 500 mg. of the compound of Example 42 with N-bromoacetamide and water according to the procedure of Example 32 affords after crystallization from acetone-hexane the desired product.

Example 44

16α-THIOMETHYLHYDROCORTISONE 21-ACETATE

A sample of 100 mg. of the product of Example 43 is treated with zinc according to Example 7. Work-up of the reaction solution in a manner similar to that described in Example 30 affords the desired product.

Example 45

16α-THIOMETHYLCORTISONE 21-ACETATE

The product of Example 44 (100 mg.) is oxidized according to Example 34. Work-up in the manner described affords the product of this example.

Example 46

16α-THIOMETHYLHYDROCORTISONE

The compound of Example 44 (75 mg.) is hydrolyzed according to Example 35. The product is crystallized from acetone-hexane.

Example 47

16α-THIOMETHYL-9β,11β-OXIDO-Δ⁴-PREGNENE-17α,21-DIOL-3,20-DIONE 21-ACETATE

A solution of 300 mg. of the compound of Example 43 in methanol is treated with potassium acetate according to Example 36. The product is crystallized from aqueous acetone.

Example 48

16α-THIOMETHYL-9α-FLUOROHYDROCORTISONE 21-ACETATE

A solution of 260 mg. of the compound of Example 47 in 16 ml. of redistilled chloroform is saturated with hydrogen fluoride according to Example 37. The reaction mixture is treated according to the latter example, whereby one obtains the desired product upon crystallization from acetone.

Example 49

16α-THIOMETHYL-9α-FLUOROCORTISONE 21-ACETATE

The compound of Example 48 (100 mg.) is oxidized with chromic-sulfuric acid reagent according to Example 34. The product is crystallized from acetone-hexane.

Example 50

16α-THIOMETHYL-9α-FLUOROHYDROCORTISONE

The compound of Example 48 (100 mg.) is hydrolyzed according to Example 35. The product is crystallized from acetone.

Example 51

16α-THIOMETHYLPREDNISOLONE 21-PROPIONATE

A solution of 200 mg. of the compound of Example 35 in 6 ml. of dry pyridine is treated with 0.6 ml. of propionic anhydride and then allowed to stand at room temperature for 4 hours. The solution is poured into ice-water and the product filtered and cristalilzed from acetone-hexane.

Example 52

16α-THIOMETHYL-9α-FLUOROPREDNISOLONE 21-CARBETHOXYLATE

A solution of 250 mg. of the compound of Example 39 in 6 ml. of dry pyridine is treated with 0.6 ml. of ethyl chlorocarbonate and allowed to stand at room temperature for 4 hours. The reaction mixture is then poured into ice-water and the resulting precipitate is filtered and then crystallized from acetone-hexane, whereby one obtains the product of this example.

We claim:
1. A compound selected from the group consisting of 16α-thiol steroids of the formula

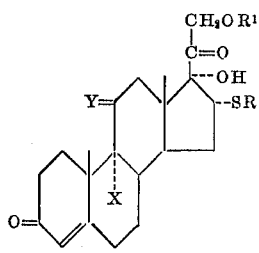

and the 1(2)-dehydro analogues thereof wherein R is a substituent selected from the group consisting of H, lower alkyl, and lower alkanoyl; $R^1$ is a substituent selected from the group consisting of H, mono- and dicarboxylic acid radicals having up to 10 carbon atoms, the sulfate radical, and the phosphate radical; Y is a substituent selected from the group consisting of (H,βOH) and =O; and X is a substituent selected from the group consisting of H and halogen.

2. The chemical compound 16α-thioacetoxyprednisolone 21-acetate.
3. The chemical compound 16α-thioacetoxyprednisone 21-acetate.
4. The chemical compound 16α-thioacetoxyprednisolone.
5. The chemical compound 16α-thioacetoxy-9α-fluoroprednisolone 21-acetate.
6. The chemical compound 16α-thioacetoxy-9α-fluoroprednisone 21-acetate.
7. The chemical compound 16α-thioacetoxy-9α-fluoroprednisolone.
8. The chemical compound 16α-thiomethylprednisolone 21-acetate.
9. The chemical compound 16α-thiomethylprednisone 21-acetate.
10. The chemical compound 16α-thiomethylprednisolone.
11. The chemical compound 16α-thiomethyl-9α-fluoroprednisolone 21-acetate.
12. The chemical compound 16α-thiomethyl-9α-fluoroprednisone 21-acetate.
13. The chemical compound 16α-thiomethyl-9α-fluoroprednisolone.
14. The chemical compound 16α-thioacetoxyprednisolone 21-propionate.
15. The chemical compound 16α-thioacetoxy-9α-fluoroprednisolone 21-carbethoxylate.
16. The chemical compound 16α-thiomethylpredisolone 21-propionate.
17. The chemical compound 16α-thiomethyl-9α-fluoroprednisolone 21-carbethoxylate.

References Cited in the file of this patent

UNITED STATES PATENTS

| | | |
|---|---|---|
| 2,773,080 | Bernstein et al. | Dec. 4, 1956 |
| 2,777,864 | Bernstein et al. | Jan. 15, 1957 |
| 2,789,118 | Bernstein et al. | Apr. 16, 1957 |
| 2,806,043 | Bernstein et al. | Sept. 10, 1957 |
| 2,814,632 | Nussbaum | Nov. 26, 1957 |
| 2,831,003 | Thomas | Apr. 15, 1958 |
| 2,912,443 | Dodson et al. | Nov. 10, 1959 |